(12) United States Patent
Eimerman (10) Patent No.: US 6,260,733 B1
(45) Date of Patent: Jul. 17, 2001

(54) RELEASABLE HANDLE FOR COOKWARE (75) Inventor: Allen C. Eimerman, Fond du Lac, WI (US)

(73) Assignee: Regal Ware, Inc., Kewaskum, WI (US)

( * ) Notice: Subject to any disclaimer, the term of this patent is extended or adjusted under 35 U.S.C. 154(b) by 0 days.

(21) Appl. No.: 09/657,695

(22) Filed: Sep. 8, 2000

(51) Int. Cl.$^7$ .................................................. B65D 25/28
(52) U.S. Cl. ............................................................ 220/759
(58) Field of Search ............................................. 220/759

(56) References Cited

U.S. PATENT DOCUMENTS

| | | |
|---|---|---|
| D. 284,444 | 7/1986 | Baumgarten . |
| D. 284,539 | 7/1986 | Baumgarten . |
| D. 284,540 | 7/1986 | Baumgarten . |
| D. 369,718 | 5/1996 | Rohrer . |
| D. 376,726 | 12/1996 | Rohrer . |
| D. 377,581 | 1/1997 | Rohrer . |
| 2,362,720 | 11/1944 | Reichart . |
| 2,494,159 | 1/1950 | Bernstein . |
| 2,712,151 | 7/1955 | Becht . |
| 3,269,765 | 8/1966 | Pryce . |
| 3,272,547 | 9/1966 | Pryce . |
| 3,306,648 | 2/1967 | Serio . |
| 3,438,082 | 4/1969 | Jones et al. . |
| 3,648,887 | 3/1972 | Hartley . |
| 3,691,605 | 9/1972 | Witte . |
| 3,707,015 | 12/1972 | Maynard . |
| 3,798,706 | 3/1974 | Wolfson et al. . |
| 3,878,584 | 4/1975 | Witte . |
| 3,883,169 | 5/1975 | Fischbach . |
| 4,019,221 * | 4/1977 | Baumgarten ........................ 16/114 A |
| 4,083,081 | 4/1978 | Witte . |
| 4,127,914 | 12/1978 | Fischbach . |
| 4,179,146 * | 12/1979 | Fischbach ........................ 16/114 A |
| 4,206,853 | 6/1980 | Iten et al. . |
| 4,577,367 | 3/1986 | Durand . |
| 4,625,361 | 12/1986 | Fischbach . |
| 4,680,829 | 7/1987 | Baumgarten . |
| 4,825,505 | 5/1989 | Witte . |
| 4,965,907 | 10/1990 | Baumgarten . |
| 5,175,907 | 1/1993 | Baumgarten . |
| 5,509,173 | 4/1996 | LaSaosa . |
| 5,555,604 | 9/1996 | Baumgarten . |
| 5,575,516 | 11/1996 | Baumgarten . |
| 5,704,092 | 1/1998 | Nicollet et al. . |
| 5,887,751 | 3/1999 | Kroscher . |

FOREIGN PATENT DOCUMENTS 01 186 000   9/1987   (EP) .

* cited by examiner

Primary Examiner—Stephen Castellano
(74) Attorney, Agent, or Firm—Ryan Kromholz & Manion, S.C.

(57) ABSTRACT

A releasable handle for use on container, particularly cookware. The releasable handle includes at least one opening formed therein and arranged to releasably receive a side handle of a piece of cookware.

12 Claims, 7 Drawing Sheets

RELEASABLE HANDLE FOR COOKWARE

BACKGROUND OF THE INVENTION

The present invention relates generally to the field of detachable handles and more specifically to detachable handles for cookware and the like. The present invention is particularly concerned with a releasable handle that may be releasably attached to cookware of a variety of shapes and sizes.

Detachable handles are known in the art. Such devices normally comprise a handle structure having mating attachment means with a compatible structure on the vessel to receive the handle. Handles of this type are greatly convenient to the consumer. This is especially true where cookware storage space is minimal for example, in apartment size kitchens having few cupboards, cookware is more easily stored if releasable handles are used.

A removable handle has been described in U.S. Pat. No. 5,887,751 in which the handle portion includes a locking mechanism and a vessel engaging portion. The locking mechanism includes a latch portion which is pivotally attached to the vessel engaging portion for pivotal movement. Such a locking mechanism is complicated because it requires the user to rotatably force a lever to attach and detach the handle.

U.S. Pat. No. 4,965,907 teaches a detachable handle which requires a mating mounting zone on the vessel. The mounting zone is provided with a frame having bulging portions to form cavities between the frame and the vessel. The handle member includes a tongue portion that is adapted to permit introduction into the cavity formed by the bulging portion. A latch is provided on the front portion of the handle. This arrangement is inconvenient as the latching and unlatching procedures take place very close to the vessel body, thus risking burn, should the vessel be hot.

A further detachable handle is disclosed in U.S. Pat. No. 4,825,505. The handle is mountable on a supporting member on the wall of the vessel. The supporting member includes two identically oriented side pieces. The handle is lockable by a retaining member locked behind inclined supporting member projections and is slidably supported parallel to the vessel wall. The retaining member is a rigid bar associated with a spring element. However, this handle requires the use of a push rod-like tool inserted in a hole for release of the handle from the vessel. This is inconvenient and difficult to use.

The present invention is an improved releasable handle that overcomes the aforementioned drawbacks, is easy to use, and adaptable in design. The present handle includes an insert cavity wherein a generally U-shaped leaf spring latches a vessel attachment member securely within the cavity. Further, the handle of the present invention is easily removed and attached. Also, the handle of the present invention is readily interchangeable with other attachable cookware.

It is also desired to achieve a releasable handle design that is easy to manufacture, yet reliable and may be used in combination with many sizes and shapes of vessels.

Another objective of the present invention is ease of use. While some handles currently in use include a detachable feature, they are often difficult to remove or attach, especially those requiring the user to impart a complex set of movements to the handle either to remove or attach it to the vessel. This is especially true if the person attaching and detaching the handle is disabled, has arthritis, or another ailment, which limits the manual dexterity of that person.

A further objective of the present invention is to provide a new and novel detachable handle which is particularly adapted for use with vessels having a side attachment member, such as a mating handle or extension.

Yet another objective of the present invention is to provide a detachable handle which can be easily detached from a piece of cookware or other vessel in a one-hand operation by depressing an actuating button to release the attachment means.

The present invention is believed to address these and other objectives by the unique and simple structures disclosed herein.

SUMMARY OF THE INVENTION

The present invention may be generally described as a releasable handle for attachment to vessels, particularly cookware. The releasable handle includes a body member having an attachment end and a free end. The body member has at least one insert cavity located at the attachment end. The releasable handle of the present invention is designed to releasably engage a mating side attachment member of a piece of cookware, cooking vessel or other cookware with substantially similar attachment members. The attachment member slides into the insert cavity of the releasable handle wherein a leaf spring latches the attachment member securely within the insert cavity. The leaf spring preferably is of a generally U shape and includes a pair of bifurcated limbs. The bifurcated limbs each terminate at one end in an intermediate bail portion, and at the opposite end in a free end. At least one of the limbs preferably includes a curved portion located intermediate the bail portion and the free end, and adapted to engage the attachment member located on the vessel to receive the handle. The insert cavity of the body portion is adapted to retain the leaf spring therein, and to that end, may be provided with abutment means for engaging a free end of at least one of the bifurcated limbs.

The releasable handle is further provided with unlatching means whereby the latching action of the leaf spring on the attachment member may be released. The unlatching means of the present invention may be a manually operated pushbutton, or any other means arranged to contact the latching limb of the leaf spring and depress the limb, thereby releasing the attachment member. It is presently believed preferable that the pushbutton include a slot for receiving a free end of at least one of the bifurcated limbs. Alternatively, the pushbutton may include a headed portion defining a laterally extending flanged area. The insert cavity of the present invention may further include axially aligned, oppositely disposed transverse openings for receiving the headed pushbutton or other unlatching means. In an embodiment, one of the above-mentioned openings defines an internal countersunk portion arranged to receive the corresponding flanged area of the pushbutton. Furthermore, the other, oppositely disposed opening preferably includes a periphery that is equal to, or greater than, the periphery of the headed portion of the pushbutton. This arrangement allows facile manufacturing of the handle as the pushbutton may be inserted into the insert cavity prior to insertion of the spring, via the second opening.

A handle made according to the present invention may be of any length or shape necessary for a particular cooking or cookery application. Further, it is contemplated that a vessel adapted to receive the releasable handle of the present invention may use one or more of the handles during a single application, as well as be interchangeable with the stationary, attached member or members of other cooking vessels. For example, a heavy soup vessel may require at least two handles of relatively short length, while a flambe vessel may utilize a single, relatively long releasable handle.

DESCRIPTION OF THE DRAWINGS

FIGS. 4a, 4b and 4c depict the manufacturing sequence of the embodiments shown in FIGS. 1–2a, in which.

FIGS. 7a, 7b, and 7c depict the manufacturing sequence for the preferred embodiment seen in FIGS. 5–6a, in which.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
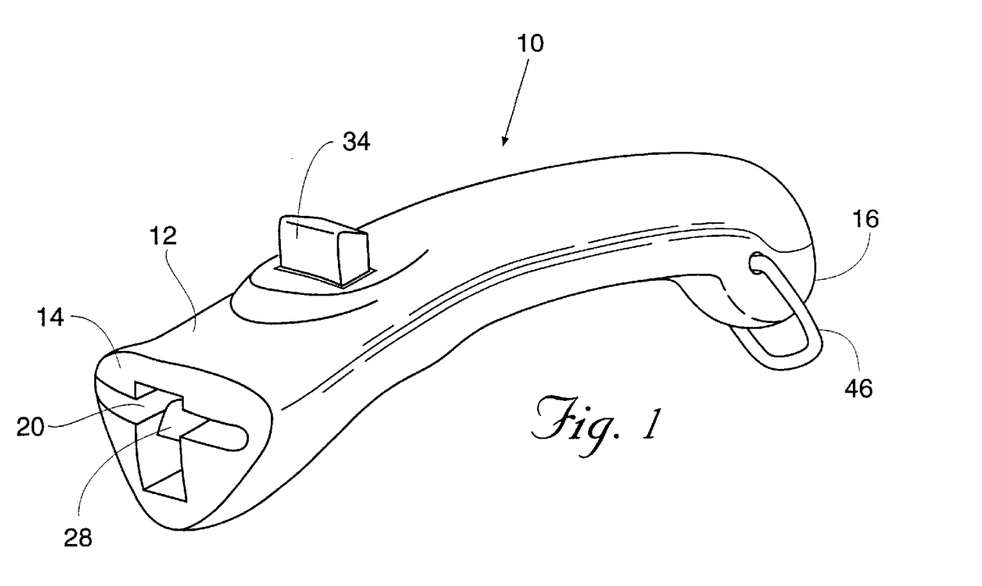
FIG. 1 is a perspective view of a releasable handle of the present invention.

Referring now to the drawings, wherein like reference numbers refer to like parts throughout the views, there is shown in FIG. 1 a first embodiment of the releasable handle 10 of the present invention. The releasable handle 10 includes an integrally formed body or shaft portion 12 having an attachment end 14 and a free end 16. The handle of the present invention is preferably molded from a conventional thermal molding composition. Seen particularly in the views of FIGS. 2 and 2a, the attachment end 14 further includes an insert cavity 20 for receiving a mating side attachment member 18 of a container 19 (seen as a cooking vessel in FIG. 3). A leaf spring 22 is located in the insert cavity 20 and serves to releasably secure the attachment member 18 in the cavity 20, thereby attaching the handle 10 to the container 19. The leaf spring 22 is preferably formed from conventional flexible metal sheet material and is of a generally U-shape, including a pair of integrally formed bifurcated limbs 24a, 24b. Each of the bifurcated limbs 24a, 24b terminates at one end in an intermediate bail portion 26, and at the opposite end in a free end 28. At least one of the limbs 24a, 24b preferably includes an indent or curved portion 30 located intermediate the bail portion 26 and the free end 28. The indented or curved portion 30 is adapted to engage the side attachment member 18 of the container 19 at a transverse attachment bar 18a when the attachment member 18 is inserted into the cavity 20. It is to be understood that the indented or curved portion 30 may be of any suitable shape which will provide a releasable indent/detent relationship with attachment bar 18a.

Figure 2:
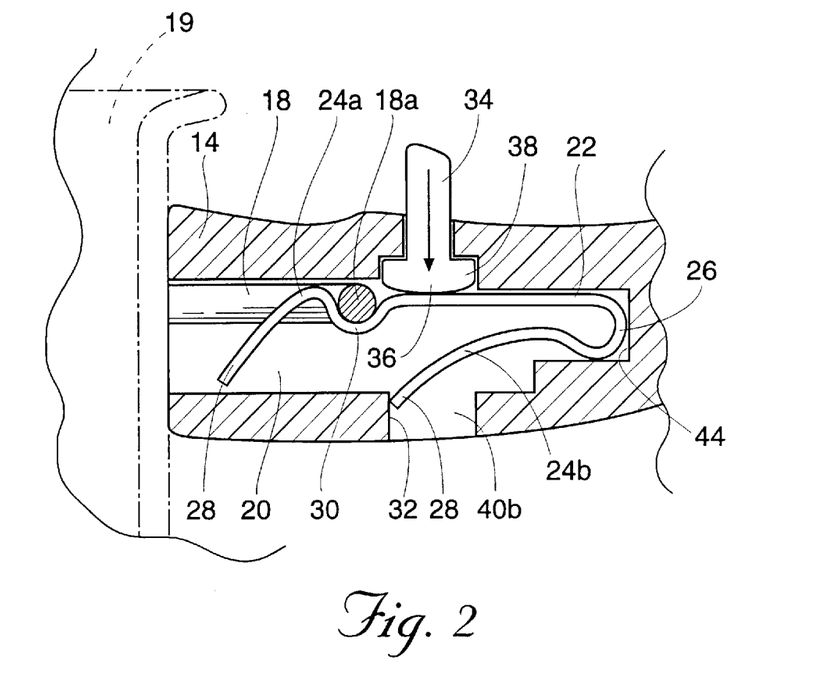
FIG. 2 is a fragmentary, longitudinal sectional view of a portion of the releasable handle illustrated in FIGS. 1 and 1a, as attached to a container and disclosing the cooperating components thereof.
Figure 2A:
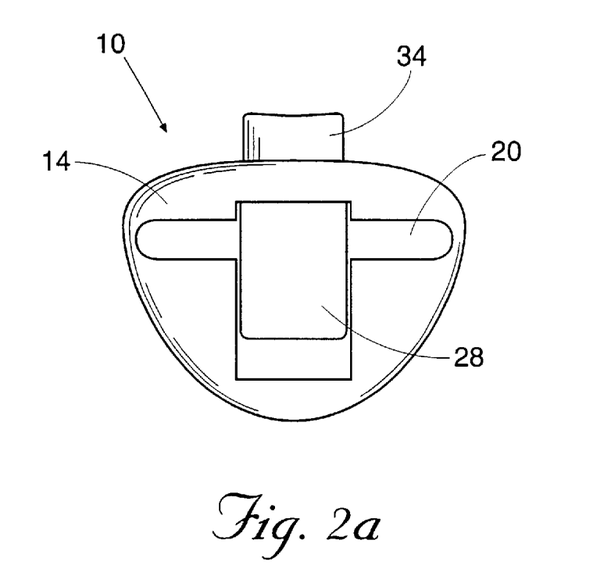
FIG. 2a is an end view of the releasable handle seen in FIG. 1, and showing the insert cavity.

As best seen in FIG. 2, the insert cavity 20 is adapted to retain the leaf spring 22 therein by way of an abutment 32. The abutment 32 engages a free end 28 of at least one of the bifurcated limbs 24a, 24b. The releasable handle 10 is further provided with an unlatching means, seen as a pushbutton 34 in these views The pushbutton 34 is preferably manually operated and is arranged to contact the leaf spring 22 and depress limb 24a, thereby releasing the bar 18a of the side attachment member 18. It is presently believed preferable that the pushbutton 34 include a headed portion 36 defining a laterally extending flanged area 38.

Figures 4A, 4B:
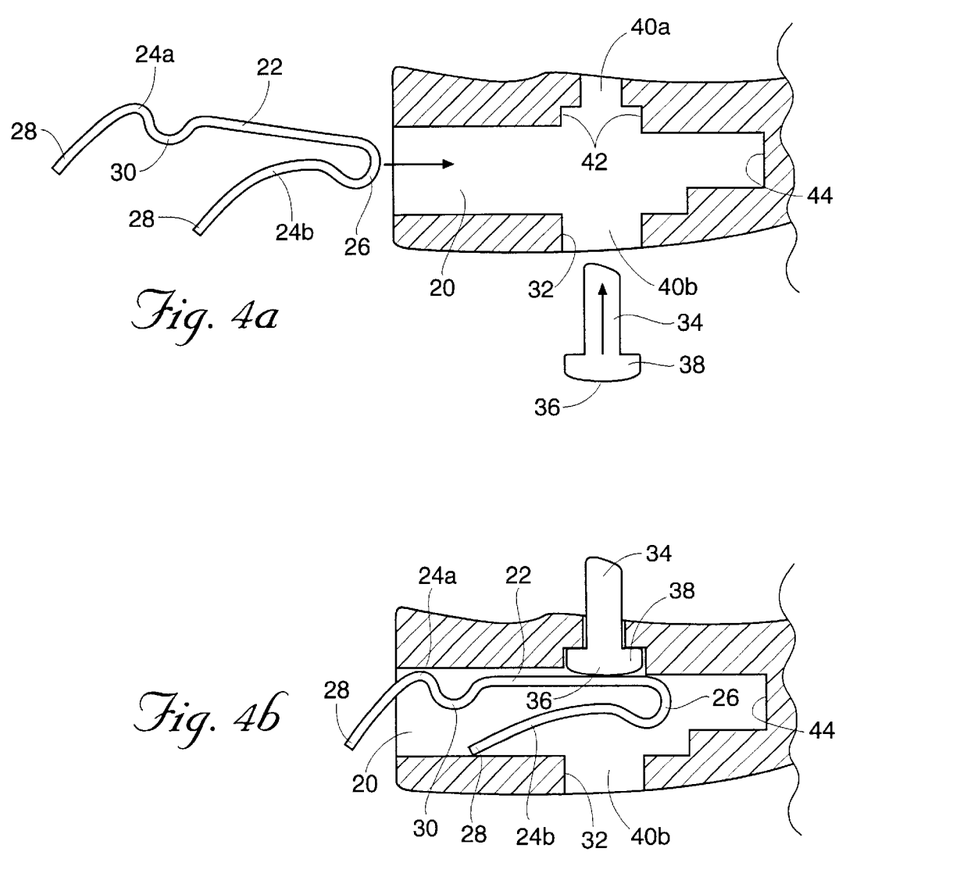
FIG. 4a is a fragmentary, longitudinal cross section of a handle of the present invention and showing the leaf spring and pushbutton in condition for insertion in the cavity.
FIG. 4b is a fragmentary, longitudinal cross section of a handle of the present invention and showing the pushbutton seated in the shoulder area of the cavity and the leaf spring partially inserted in the cavity.

As best seen in the view of FIG. 4a, the cavity 20 of the handle 10 is preferably provided with axially aligned, oppositely disposed transverse openings 40a, 40b for receiving the pushbutton 34 or other unlatching means. In the preferred embodiment, one of the openings 40a defines an internal countersunk portion 42 arranged to receive and retain the corresponding flanged area 38 of the pushbutton 34. The countersunk portion 42 provides stability to the seated button 34 and prevents sideways and endwise movement during operation. The opposite opening 40b preferably features a periphery that is equal to, or greater than, the periphery of the headed portion 36 of the pushbutton 34. This feature allows the pushbutton 34 to be inserted into the cavity 20 during manufacturing of the handle 10 through the opening 40b.

If desired, the free end 16 of the releasable handle 10 may be optionally provided with hanging means, seen as a metal loop 46 in the view of FIG. 1. This allows the user to store the handle 10 on a wall peg (not shown) while the handle 10 is not in use.

Figure 3:
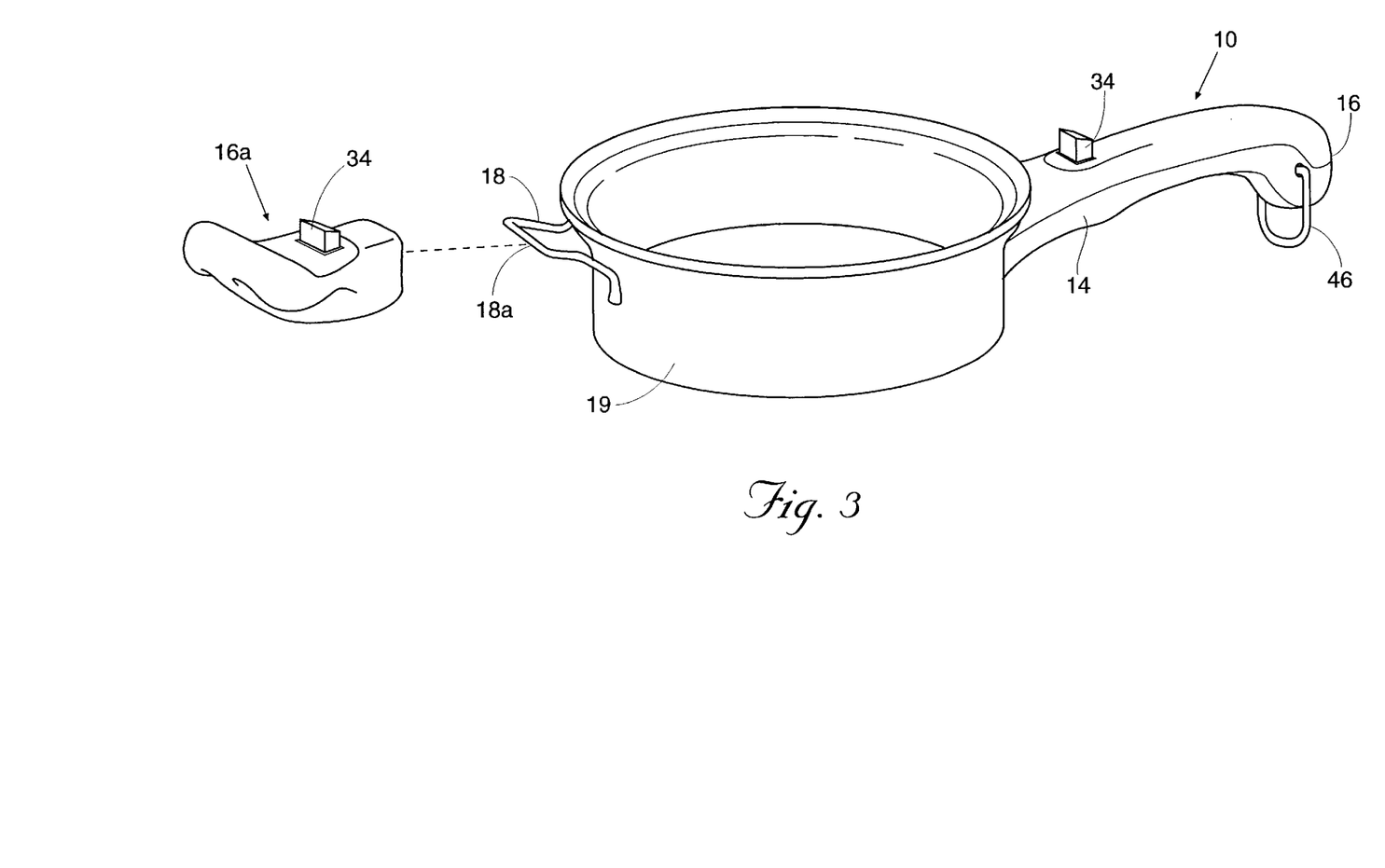
FIG. 3 is a perspective view of a container of the type to be used with the handle of the present invention, with one embodiment attached to the container and another embodiment in readiness for attachment.

As seen in FIG. 3, the releasable handle 10 is for use with containers 19 in general and particularly cookware, such as, for example, pots, saucepans, and the like. It is to be understood that the cookware configurations shown in the drawings are not meant to be exhaustive, but are merely illustrative of commercially available cooking vessels.

The method of manufacturing the releasable handle 10 of the present invention is illustrated in the views of FIGS.

Figure 4C:
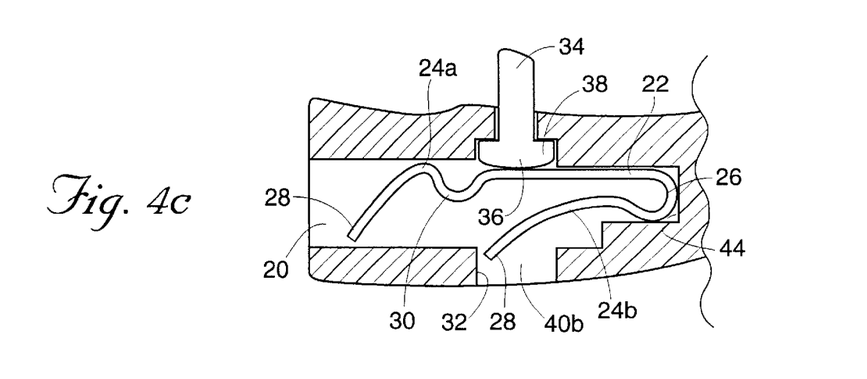
FIG. 4c is a fragmentary, longitudinal cross section of a handle of the present invention and showing the pushbutton and leaf spring seated in operating condition.

4a–4c. As seen particularly in FIG. 4a, the pushbutton 34 or other unlatching means is preferably inserted in transverse opening 40b with the headed portion 36 being inserted last. Once the pushbutton 34 is seated in the countersunk portion 42, a leaf spring 22 is inserted into the insert cavity 20 with the bail portion 26 leading. As the leaf spring 22 is inserted into the insert cavity 20, the bifurcated limbs 24a, 24b compress to allow the leaf spring 22 to be moved within the cavity 20. The leaf spring 22 is moved into the cavity 20 until the bail portion 26 reaches the terminal end 44 of the insert cavity 20. As the bail portion 26 reaches the terminal end 44, bifurcated limb 24b moves into transverse opening 40b and engages abutment 32, thereby lodging the leaf spring 22 securely within the cavity. Furthermore, once the leaf spring 22 is in place, as seen in FIG. 4c, the headed portion 36 of pushbutton 34 is held in place by adjacently located limb 24a of leaf spring 22.

Figure 1A:
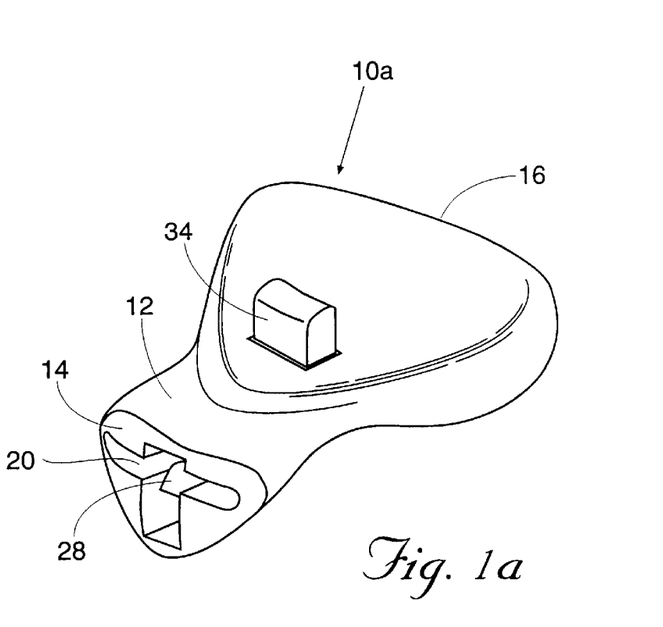
FIG. 1a is a perspective view of an alternate embodiment releasable handle of the present invention.

An alternate embodiment releasable handle 10a may be viewed in FIG. 1a. This embodiment includes a relatively short shaft portion 12. It is to be understood that the shaft 12 configurations seen in FIGS. 1 and 1a are not meant to be exhaustive, but are merely illustrative of shaft configuration currently believed to be useful. The releasable handle of the present invention may be of a variety of shapes, dimensions and materials, including, but not limited to those disclosed herein.

Figure 5:
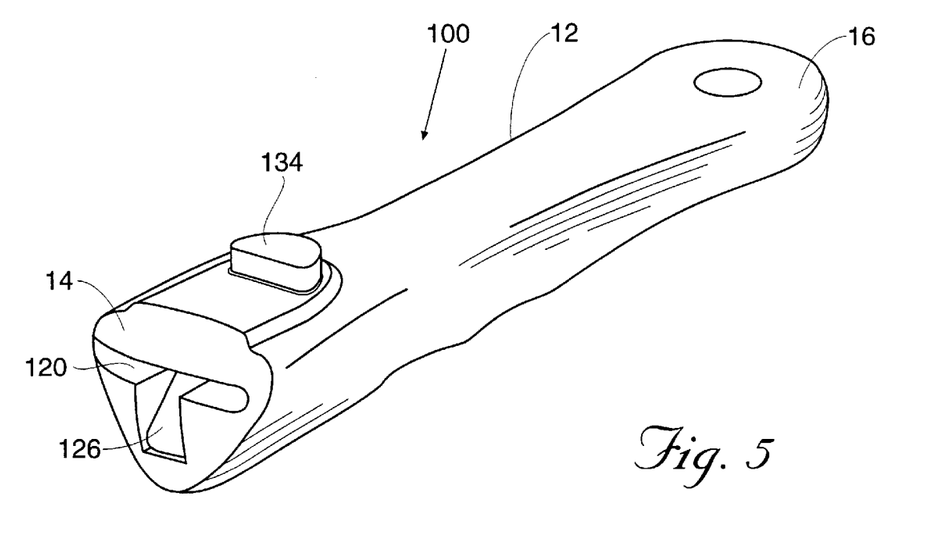
FIG. 5 is a perspective view of the preferred embodiment releasable handle of the present invention.

Referring now to FIG. 5, the preferred embodiment of the releasable handle 100 may be seen. Similarly to the previously described embodiments, the preferred embodiment handle 100 includes an integrally formed body or shaft portion 12 having an attachment end 14 and a free end 16. The preferred embodiment is preferably molded from a conventional thermal molding composition.

Figure 6:
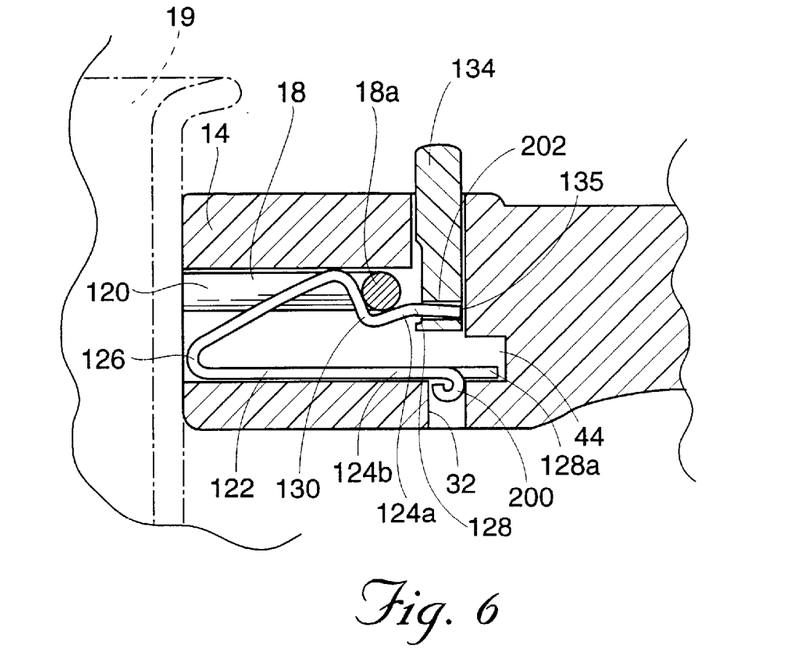
FIG. 6 is a fragmentary, longitudinal sectional view of a portion of the releasable handle shown in FIGS. 5 and 5a, as attached to a container and disclosing the cooperating components thereof.
Figure 6A:
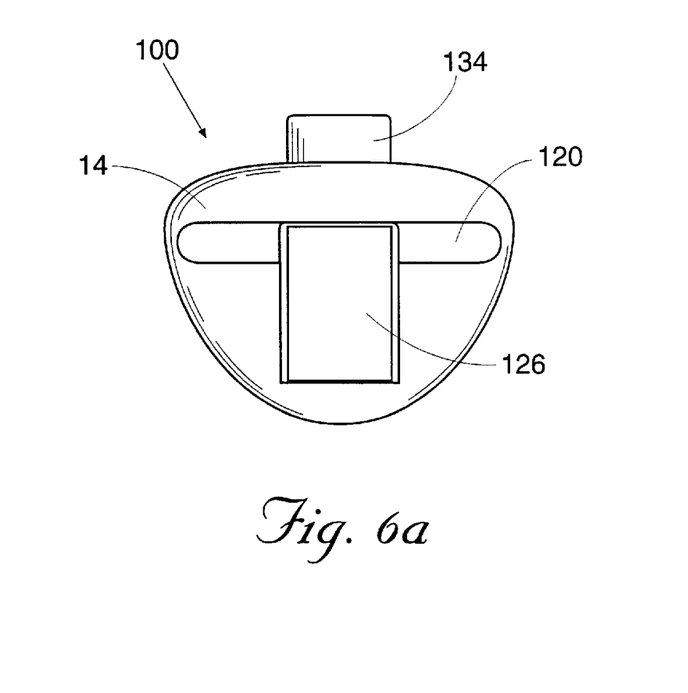
FIG. 6a is an end view of the preferred releasable handle seen in FIG. 5, and showing the insert cavity.

Seen particularly in the views of FIGS. 6 and 6a, the attachment end 14 further includes an insert cavity 120 for receiving a mating side attachment member 18 of a container 19, such as the cooking vessel seen in FIG. 3. A leaf spring 122 is located in the insert cavity 120 and serves to releasably secure the attachment member 18 in the cavity 120 thereby attaching the handle 100 to the container 19. As in the embodiment illustrated in FIGS. 1–2a, the preferred embodiment leaf spring 122 is preferably formed from conventional flexible metal sheet material and is of a generally U-shape, including a pair of integrally formed bifurcated limbs 124a, 124b. Each of the bifurcated limbs 124a, 124b terminates at one end in an intermediate bail position 126, and at the opposite end in a free end 128. At least one of the limbs 124a, 124b preferably includes an indent or curved portion 130 located intermediate the bail portion 126 and the free end 128. The indented or curved portion 130 is adapted to engage the side attachment member 18 of the container 19 at a transverse attachment bar 18a when the attachment member is inserted into the cavity 120.

As in the previously described embodiment, it is to be understood that the indented or curved portion 130 may be of any suitable shape which will provide a releasable indent/detent relationship with side attachment bar 18a.

As best seen in FIG. 6, at least one of the limbs 124a, 124b preferably includes a free end 128a including a looped portion 200. The insert cavity 120 of the preferably embodiment is adapted to retain the leaf spring 122 therein by way of an abutment 32. The abutment 32 engages the looped portion 200 of free end 128a of at least one of the limbs 124a, 124b. The preferred embodiment releasable handle 100 is further provided with an unlatching means, seen as an apertured pushbutton 134 in the views of FIGS. 5–7c. The apertured pushbutton 134 is preferably manually operated and is arranged to retainably engage a tang portion 202 of the free end 128 of at least one of the bifurcated limbs 124a, 124b through its aperture 135. As the pushbutton is depressed, so also is the limb 124a depressed, thereby releasing the bar 18a of the side attachment member 18.

Figure 7A:
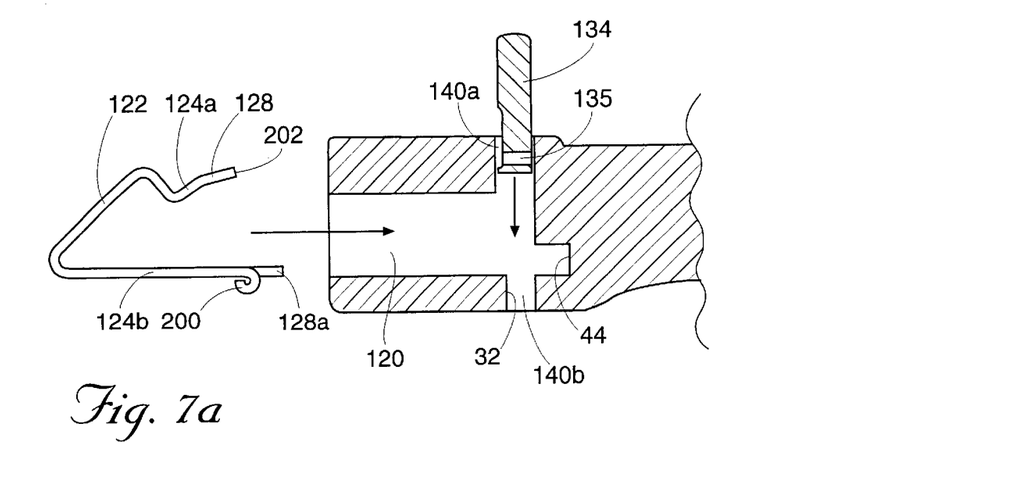
FIG. 7a is a fragmentary, longitudinal cross section of the preferred embodiment handle and showing the leaf spring and pushbutton in condition for insertion in the cavity.

As best seen in the view of FIG. 7a, the cavity 120 of the preferred embodiment handle 100 is preferably provided with axially aligned, oppositely disposed transverse openings 140a, 140b for receiving the apertured pushbutton 134 or other unlatching means.

Figure 7B:
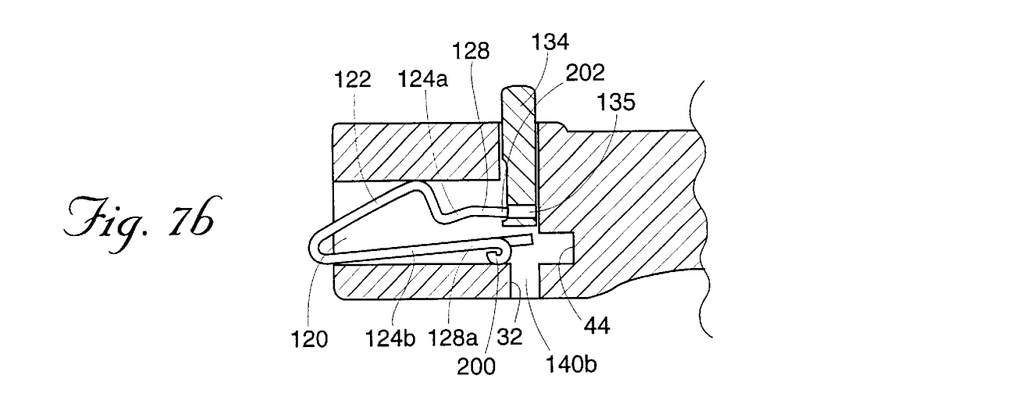
FIG. 7b is a fragmentary, longitudinal cross section of the preferred embodiment handle and showing the leaf spring particularly inserted in the cavity and the tang portion of the leaf spring inserted in the pushbutton slot.
Figure 7C:
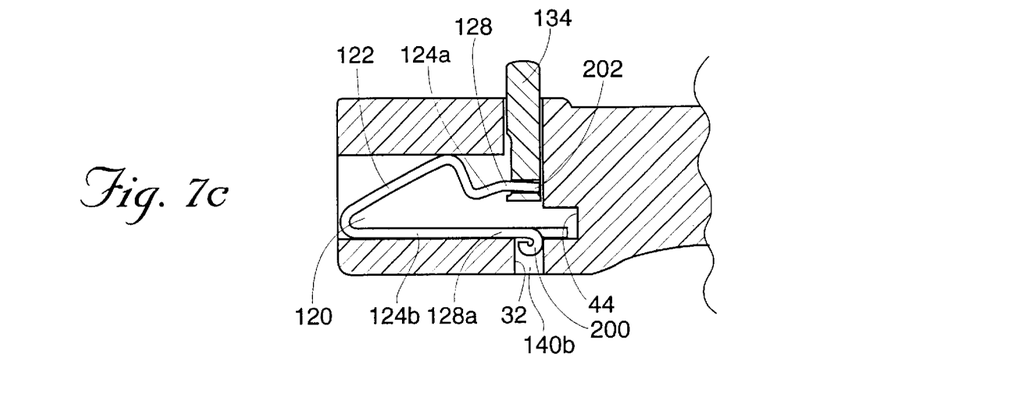
FIG. 7c is a fragmentary, longitudinal cross section of the preferred embodiment handle and showing the leaf spring and pushbutton seated in operating condition.

The preferred method of manufacturing the releasable handle 100 of the present invention is illustrated in the views of FIGS. 7a–7c. As seen particularly in FIG. 7a, the pushbutton 134 or other unlatching means is preferably inserted in transverse opening 140a. Once the pushbutton 134 has entered the cavity 120 the leaf spring 122 is inserted into the insert cavity 120 with the limbs 124a, 124b leading. As the leaf spring 122 is inserted into the insert cavity 120, the bifurcated limbs 124a, 124b compress to allow the free end 128 having tang portion 202 to be moved within the aperture 135 in pushbutton 134. The leaf spring 122 is moved into the cavity 120 until the free end 128a reaches the terminal end 44 of the insert cavity 120. As the free end 128a reaches the terminal end 44, the looped portion 200 of free end 128a moves into transverse opening 140b and engages abutment 32, thereby lodging the leaf spring 122 securely within the cavity 120. Furthermore, once the leaf spring 122 is in place, as seen in FIG. 7c, the free end 128 having tang portion 202 is held in place by the aperture 135 of pushbutton 134.

Figure 5A:
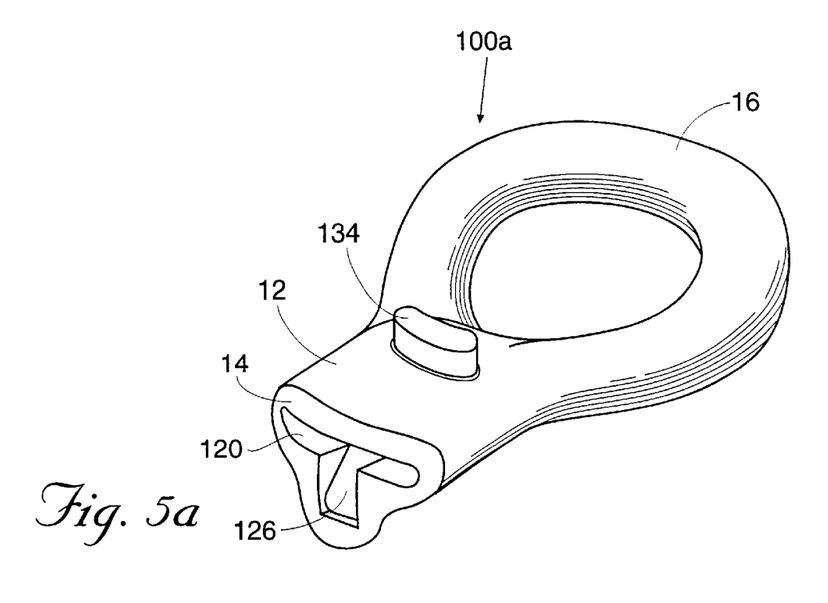
FIG. 5a is a perspective view of an alternative form of the preferred releasable handle of the present invention.

A further configuration of the preferred embodiment releasable handle 100 may be viewed in FIG. 5a. This embodiment includes a relatively short shaft portion 12. It is to be understood that the shaft 12 configurations seen in FIGS. 5 and 5a are not meant to be exhaustive, but are merely illustrative of shaft configuration currently believed to be useful. The preferred embodiment releasable handle of the present invention may be of a variety of shapes, dimensions and materials, including, but not limited to those disclosed herein.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A releasable handle for a container, the container having at least one mating side attachment member, said attachment member including a transverse attachment bar, said handle comprising:

a body portion having an attachment end and a free end:
an insert cavity for receiving said side attachment member, said insert cavity located at the attachment end of said body portion;
means for releasably securing said side attachment member in said insert cavity comprising an integrally formed leaf spring having a pair of bifurcated flexible limbs and an intermediate bail portion, and wherein at least one of said limbs includes an indent portion, said indent portion being adapted for alternative latching and unlatching engagement with said mating side attachment member, said means for releasably securing further includes means for unlatching said indent portion.

2. The releasable handle of claim 1 wherein said insert cavity includes abutment means for engagement with a free end of one of said bifurcated limbs to retain said leaf spring in said insert cavity.

3. The releasable handle of claim 1 wherein said unlatching means comprises a manually operated pushbutton arranged to contact said limb having said indent portion in a direction for release of said limb from said side attachment member.

4. The releasable handle of claim 3 wherein said cavity includes axially aligned, oppositely disposed transverse openings for receiving said pushbutton.

5. The releasable handle of claim 4 wherein said pushbutton includes a headed end portion defining a laterally extending flanged area, and wherein one of said openings defines an internal countersunk portion adapted to receive said laterally extending flange of said pushbutton.

6. The releasable handle of claim 5 wherein the other of said openings has a periphery equal or greater than the periphery of said headed end of said pushbutton.

7. A method of manufacturing a releasable handle for a container, said method comprising the steps of:
provuding a container having at least one mating side attachment member;
providing a handle having a body portion including an attachment end and a free end, said attachment end including an insert cavity for receiving said side attachment member; and
providing means for releasably securing said side attachment member in said cavity, wherein said means for releasably securing said side attachment member comprises an integrally formed leaf spring including a pair of bifurcated flexible limbs and an intermediate bail portion, and wherein at least one of said limbs includes an indent portion, said indent portion being adapted for alternative latching and unlatching engagement with said mating side attachment member.

8. The method of claim 7 further including the step of providing abutment means within said cavity for engagement of a free end of said leaf spring.

9. A releasable handle for a container, the container having at least one mating side attachment member, said attachment member including a transverse attachment bar, said handle comprising:
a body portion having an attachment end and a free end:
an insert cavity for receiving said side attachment member, said insert cavity located at the attachment end of said body portion;
means for releasably securing said side attachment member in said insert cavity comprising an integrally formed leaf spring having a pair of bifurcated flexible limbs and an intermediate bail portion, and wherein at least one of said limbs includes an indent portion, said indent portion being adapted to latchingly engage said mating side attachment member; and
unlatching means for disengaging said indent portion from said side attachment member wherein said unlatching means comprises a manually operated push button arranged to contact said limb having said indent portion in a direction for release of said limb from said side attachment member.

10. The releasable handle of claim 9 wherein said cavity includes axially aligned, oppositely disposed transverse openings for receiving said push button.

11. The releasable handle of claim 10 wherein said push button includes a headed end portion defining a laterally extending flanged area, and wherein one of said openings defines an internal countersunk portion adapted to receive said laterally extending flange of said push button.

12. The releasable handle of claim 11 wherein the other of said openings has a periphery equal or greater than the periphery of said headed end of said push button.

* * * * *